United States Patent [19]

Mushiage et al.

[11] Patent Number: 5,661,581
[45] Date of Patent: Aug. 26, 1997

[54] OPTICAL COMMUNICATION UNIT

[75] Inventors: Masato Mushiage; Naotaro Nakata; Yuta Tezen, all of Kyoto; Kenji Okada, Yokohama, all of Japan

[73] Assignees: Rohm Co., Ltd., Kyoto; Nippon Telegraph & Telephone Corporation, Tokyo, both of Japan

[21] Appl. No.: 542,014

[22] Filed: Oct. 12, 1995

[30] Foreign Application Priority Data

Oct. 17, 1994 [JP] Japan ..................................... 6-250460

[51] Int. Cl.$^6$ ................................................ H04B 10/00
[52] U.S. Cl. .............................. 359/163; 359/159; 372/50; 372/92
[58] Field of Search ...................... 359/159, 152, 359/163, 154, 168; 372/45, 50, 92; 313/506

[56] References Cited

U.S. PATENT DOCUMENTS 5,252,895 10/1993 Leksell et al. ......................... 313/506
5,515,391 5/1996 Endriz ..................................... 372/50

Primary Examiner—Kinfe-Michael Negash
Attorney, Agent, or Firm—Nikaido Marmelstein Murray & Oram LLP

[57] ABSTRACT

An optical communication unit includes a light emitting element for emitting a transmission signal light; a condenser lens for coupling the transmission signal light from the light emitting element to an optical transmission path; and a light receiving element for receiving a receiving signal light from the optical transmission path. A light emitting surface in the light emitting element is formed by a plane tilted to a perpendicular plane in a substrate surface of a chip in the light emitting element.

12 Claims, 5 Drawing Sheets

OPTICAL COMMUNICATION UNIT

BACKGROUND OF THE INVENTION

The invention relates to an optical communication unit, and more particularly, to an optical communication unit suited for time division bidirectional communication and the like in the terminals for subscriber-system communication using optical fibers.

As shown in FIG. 4, the basic construction of a bidirectional optical communication unit comprises a light emitting element 21 such as a semiconductor laser that generates transmission signal light, a light receiving element 22 comprising a photo diode, photo transistor, photo cell, and the like, which receives the receiving signal light via a half mirror 23, a condenser lens 24 that joins the transmission signal light to an optical transmission path such as optical fibers, and a rod lens 25 for joining the condensed light to a ferrule 26 of the optical transmission path, and the rod lens 25 and ferrule 26 are held with a split sleeve 28 so that the center of the rod lens 25 aligns with the center of the fiber 27 at the center of the ferrule 26. The contact surfaces of the rod lens 25 and ferrule 26 are ground to a convex sphere so that they come into physical contact. The rod lens 25 is in contact with the tip end of the optical fiber, where physical contact means that the contact surfaces closely stick together by polishing the contact surfaces of lens or ferrule end face to a convex sphere so as to prevent Fresnel reflection.

In this optical communication unit, the transmission signal light and the receiving signal light are separated by inserting the half mirror 23 into an optical transmission path, the light emitting element 21 and the light receiving element 22 are arranged separated from each other, and the transmission signal light is condensed by the light condenser lens 24 and converged to the physical contact section between the rod lens 25 and the ferrule 26. The receiving signal light from the optical fiber is 50% reflected by the half mirror and received by the light receiving element 22. The end face of the light emitting element 21 and the light receiving surface of the light receiving element 22 are tilted (or inclined) to the optical axis to prevent the receiving signal light, which is reflected on the surface of the light receiving element 22, or is transmitted through the half mirror 23 and reflected at the end face of the light emitting element 21, returning to the optical fiber, and serving as a noise source.

A conventional optical communication unit is designed with the surface of the light emitting element or the light receiving element tilted obliquely to prevent the receiving signal light from the optical transmission path from being reflected at the light emitting element or light receiving element and from returning to the optical transmission path, and then from returning to the light emitting source of the signal light to generate noise. Consequently, the outgoing beam from the light emitting element for transmission is not coupled with the condenser lens 24 by only one half, which is further reduced in half at the half-mirror 23 and is incident on the optical transmission path. Since the light incident on the optical fiber 27 is further reduced, the coupling efficiency of the light emitting element 21 and the condenser lens 24 lowers, which requires increased output of the light emitting element, causing a serious problem.

On the other hand, in the Japanese Unexamined Patent Publication No. 77382/1986, for a semiconductor laser used for a light emitting element such as optical communication units and the like, there is disclosed a semiconductor laser with a construction in which a semiconductor laser chip 31 is disposed obliquely to the condenser lens, almost all the transmission signal light is coupled with the condenser lens, and the signal receiving light from the optical transmission path and incident on the light emitting element side has the light emitting element end face slanted to the optical axis of the condenser lens by setting the tilting angle τ to more than 5° to perpendicular of both end faces of the stripe groove 32, a light emitting area, and deviating the direction of outgoing beam by a specified angle perpendicular to the chip end face of the light emitting element, as shown in FIG. 5, thereby enabling the receiving signal light to be reflected in directions not related to the optical transmission path. However, when an optical transmission unit configured as above is assembled using the semiconductor laser with the above construction, it must be assembled in such a manner that the outgoing beam direction of the light emitting element conforms to the optical axis direction of the condenser lens, but there is no positioning reference between the outgoing beam direction of the light emitting element and the shape of the mounted plate, and it is impossible to completely align the outgoing beam direction with the optical axis of the condenser lens, creating a problem of lowering the coupling efficiency.

SUMMARY OF THE INVENTION

This invention is made to solve the above-mentioned problems, and it is the main object of this invention to provide an optical communication unit which couples the transmission signal light generated from the light emitting element efficiently to the optical transmission path, and at the same time, which reflects the receiving signal light from the optical transmission path in such a manner as to prevent the reflected light from returning to the optical transmission path even when it impinges on the light emitting element side, and which is easy to assemble and provides a high coupling efficiency.

An optical communication unit of the present invention comprises:

a light emitting element for emitting a transmission signal light;

a condenser lens for coupling said transmission signal light from said light emitting element to an optical transmission path; and a light receiving element for receiving a receiving signal light from said optical transmission path;

wherein a light emitting surface in said light emitting element is formed by a plane tilted to a perpendicular plane in a substrate surface of a chip in said light emitting element.

The emitting layer is formed on a plane parallel to the substrate surface.

It is preferable that an absolute value of an angle between said light emitting surface and said perpendicular plane is at least $1/n \cdot \sin^{-1}(NA)$, wherein n is an index of refraction of a light emitting layer, and NA is a numerical aperture of said condenser lens. As a result, the receiving signal light is not returned to the optical transmission path even if the light receiving signal light is entered in the side of the light emitting element.

It is preferable that said light emitting element and said condenser lens are arranged in such a manner that said substrate surface of said chip and an optical axis of said condenser lens cross at right angles, and a light reflecting section is arranged between said light emitting element and said condenser lens, such that a light from said light emitting element is reflected to advance in a side of said condenser lens. As a result, the emitting beam direction of the light emitting element is perpendicular to the optical axis of the condenser lens, and the unit can be downsized.

It is preferable that the light reflecting section is common to the light receiving element. As a result, it is not necessary to use an expensive half-mirror.

It is preferable that said light emitting surface is a dearage plane. As a result, the tilted plane is easily obtained.

It is preferable that an angle between a reflecting surface of said light reflecting section and said substrate surface is $45°-(N-1)/2\cdot\phi$, where n is an index of refraction of said light emitting layer, and $\phi$ is a tilted angle of said light emitting element to said perpendicular plane in said substrate surface of said chip, said angle is positive when said light emitting surface and said reflecting surface are inclined in a different direction with respect to said perpendicular surface, and said angle is negative when said light emitting surface and said reflecting surface are inclined in the other direction with respect to said perpendicular surface. As a result, the transmission signal light can be completely coupled to the condenser lens, the receiving signal light is not returned to the optical transmission path by transversely moving the reflecting light even if the light receiving signal light is entered in the side of the light emitting element.

According to this invention, because a semiconductor laser in which the light emitting plane (light emitting surface) of the light emitting element is formed with a plane tilting from the perpendicular plane with respect to the substrate surface of the light emitting element is used for the light emitting element forming the optical communication unit, the outgoing beam direction of the transmission signal light does not form a perpendicular direction with the light emitting plane of the semiconductor laser. That is, between the angle $\theta_1$ and the angle $\phi$ there is obtained a relation of $n\cdot\sin\phi=\sin\theta_1$ from the Snell's law, said angle $\theta_1$ being formed between the normal at the emitting plane and outgoing beam emitted from the semicondor laser, said angle $\phi$, being formed between the semiconductor laser beam emitting plane and the plane perpendicular to the chip substrate plane of the semiconductor laser. Consequently, $\theta_1$ becomes about $n\cdot\phi$ and the outgoing beam is emitted in a direction deviated by $n\cdot\phi$(that is $(n-1)\cdot\phi$ to horizontal, which is the chip substrate surface). Consequently, by disposing the condenser lens in the outgoing beam direction, the reflected beam reflects in the direction deviated by $2\theta_1$ even if the receiving signal light from the light transmission path impinges on the emitting plane of the light emitting element, and it does not enter the entrance pupil of the condenser lens by achieving the relationship $1/n\cdot\sin^{-1}(NA)<\phi$ for the numerical aperture NA of the condenser lens. According to this invention, because the beam emitting plane is tilted with the chip substrate plane of the semiconductor laser used as a reference, positioning can be achieved only by arranging the chip substrate plane on the horizontal plane when an optical transmission unit is assembled, enabling easy assembly.

DETAILED DESCRIPTION

Now referring to the accompanying drawings, the optical communication unit according to this invention will be described.

Figure 1:
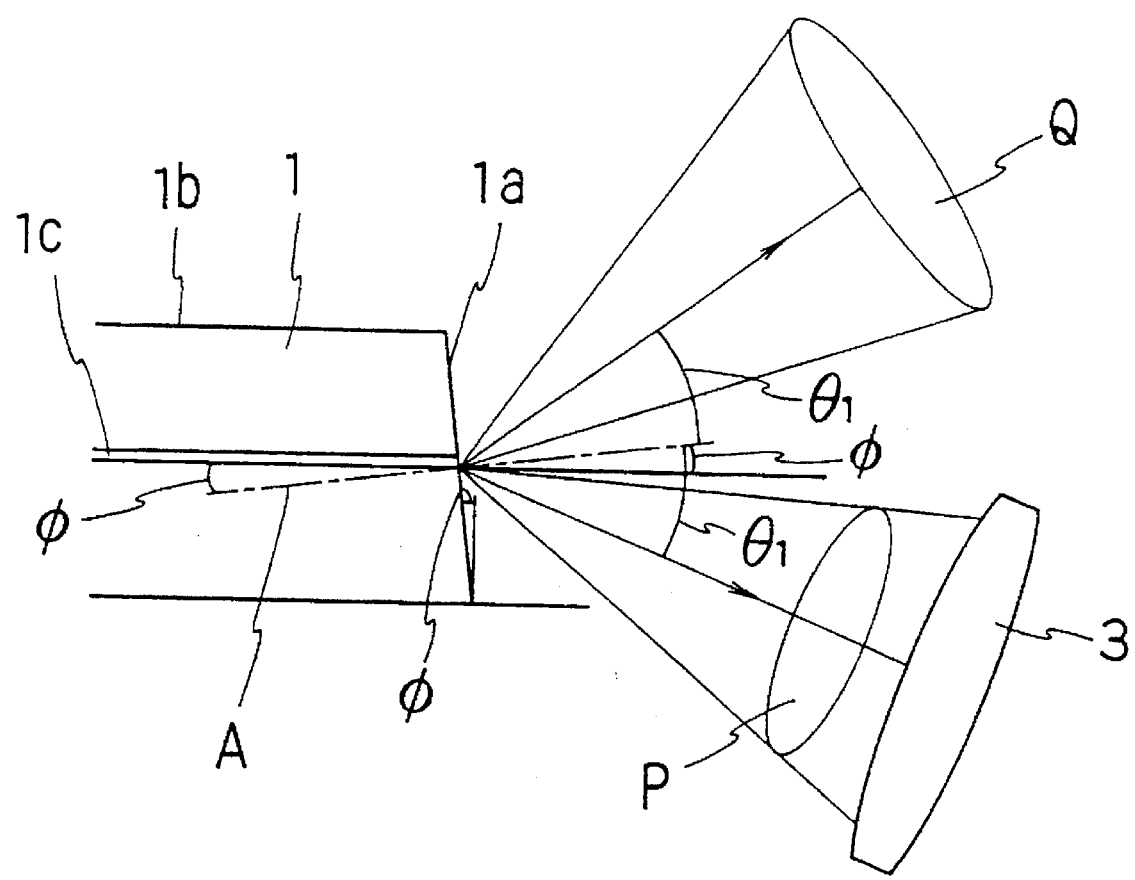
FIG. 1 diagrammatically illustrates the relationship between the coupling of transmission signal light and reflection of the receiving signal light in the light emitting element of one embodiment of the optical communication unit according to this invention.

In FIG. 1, numeral 1 is a semiconductor laser chip as a light emitting element and numeral 3 a condenser lens. The transmission signal light delivered from the semiconductor laser chip 1 is converged by the condenser lens 3 and coupled to an optical transmission path comprising optical fibers not illustrated via a rod lens and the like. The semiconductor chip 1 is formed by using off-angle wafer in which semiconductor crystal is allowed to grow on a semiconductor wafer surface which has a polished plane tilted, for example, 2° to 10° to the {100} crystal plane. This off-angle wafer is formed not by cutting ingot perpendicular to the <100> crystal axis direction but by cutting in the direction tilted by angle $\phi$ from the perpendicular plane, and there is epitaxially grown the semiconductor crystal after polishing the wafer. As a result, the semiconductor wafer surface is not perpendicular to the <100> crystal axis direction but has the crystal direction tilted by $\phi$ from the perpendicular plane. Consequently, the cleavage plane of the semiconductor laser chip separated and formed by cleaving the semiconductor laser formed by using this semiconductor wafer has an end face 1a deviated by angle $\phi$ from the plane perpendicular to the chip substrate and from the end face 1a the transmission signal light P is emitted. This tilted angle $\phi$ depends on the numerical aperture NA of the condenser lens or the index of refraction n of the material for the light emitting layer of the semiconductor laser chip, and is preferably $1/n\cdot\sin^{-1}$ (NA) or over from the viewpoint of completely preventing the receiving signal light from returning to the optical transmission path.

To manufacture semiconductor laser by using this off-angle wafer, it can be obtained by allowing a bottom cladding layer comprising, for example, n-type InP, an active layer comprising, for example, a non-dope InGaAsP, the first upper cladding layer comprising, for example, a p-type InP, a current blocking layer comprising n-type InGaAsP with a stripe groove, the second upper cladding layer comprising p-type InP, and a cap layer comprising p-type InGaAsP to epitaxially grow successively on the polished surface of the wafer with the crystal axis direction tilted by angle $\phi$ from the perpendicular plane of the polished surface, in the same manner as in the case of usual semiconductor laser. This semiconductor laser may be built into any structure, such as a rib wave-guiding channel type which generates an effective index of refraction difference by a stripe groove to confine the light or an buried type which mesa-etches both sides of the stripe area to bury a low-refraction-factor material, but the buried type provides good current-output characteristics because it can suppress the transverse expansion of the current.

Next, description will be made on the direction of the outgoing beam of the transmitting signal light P when the light emitting plane which is the end face 1a of the semiconductor laser chip 1 is tilted by angle $\phi$ with respect to the perpendicular plane of the chip substrate surface as well as the direction of the reflected light Q when the receiving signal light impinges from the optical transmission path.

As described above, the semiconductor laser chip 1 has the substrate surface 1b tilted by angle $\phi$ with respect to the {100} crystal surface, but the chip substrate has also the rear surface formed parallel to the substrate surface 1b, and the light emitting layer 1c is also parallel to the substrate surface 1b and in the semiconductor laser chip 1, it is parallel to the substrate surface 1b, that is, the light advances in the horizontal direction. On the other hand, because the index of refraction changes to that of air when light is emitted outwards from the end face 1a of the semiconductor laser chip 1, the light advances in conformity to the Snell's refraction law. That is, let the angle between the normal A of the end face 1a and the outgoing beam be $\theta_1$ and the index of refraction at the light emitting layer 1c be n; then, because the angle formed with the normal A in the light advancing direction in the semiconductor chip 1 is $\phi$, according to the Snell's law, $n \cdot \sin\phi = \sin\theta_1$. That is, $\theta_1 = \sin^{-1}(n \cdot \sin\phi) \approx n \cdot \phi$. That is, the light advances in the direction deviated by $n \cdot \phi$ to the normal A of the end surface 1a, in other words, $\theta_1 - \phi = (n-1) \cdot \phi$. Therefore, by disposing the condenser lens 3 in the direction, the center portion of the transmitting signal light emitted from the semiconductor laser chip 1 is allowed to conform to the center axis of the condenser lens 3 and is able to be entirely coupled.

Figure 2:
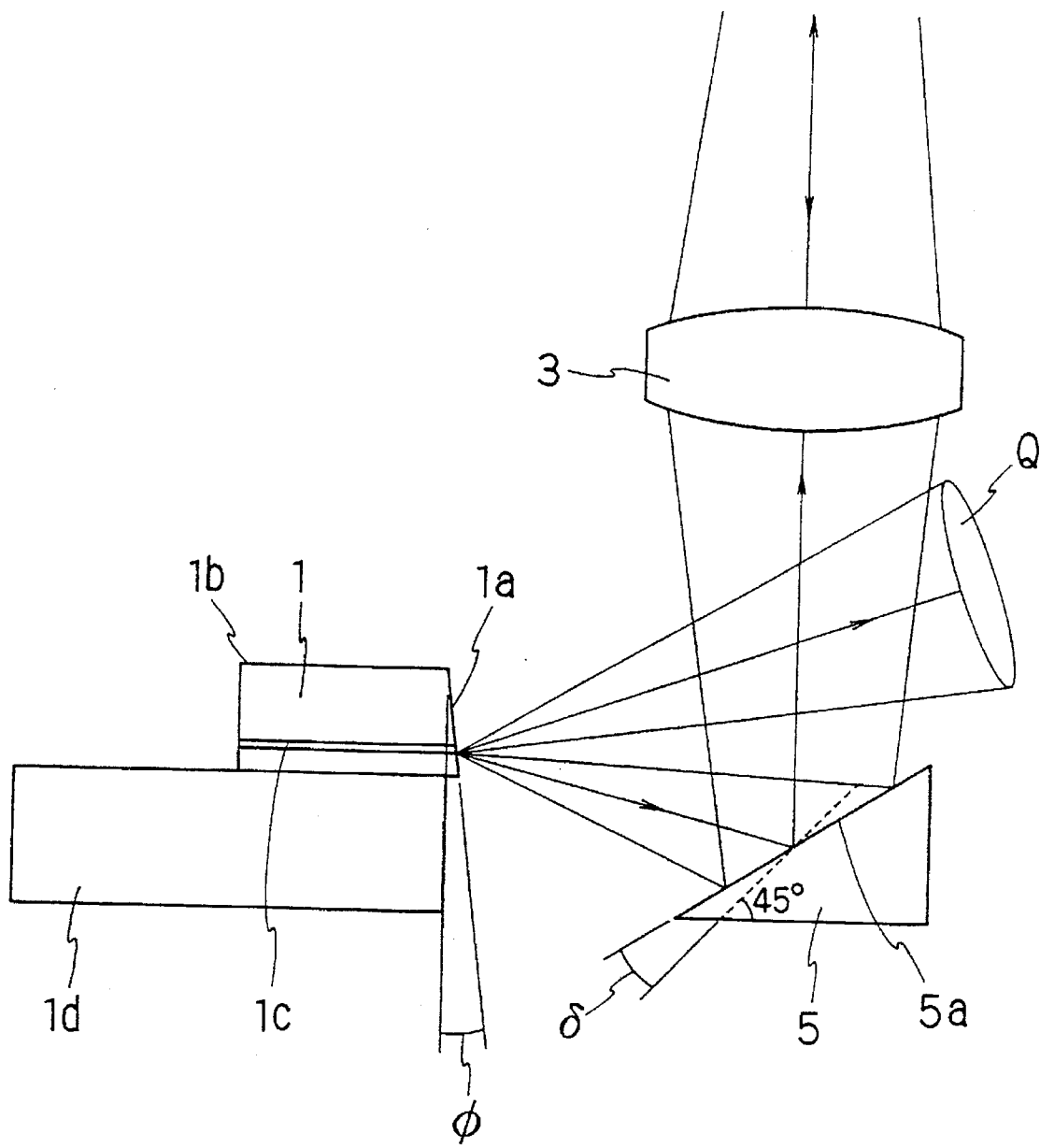
FIG. 2 diagrammatically illustrates the another embodiment in which a light reflecting surface is installed between the light emitting element and the condenser lens.

On the other hand, the receiving signal light from the optical transmission path is received by the light receiving element not illustrated, but part of the receiving signal light which does not enter the light receiving element follows the reverse course and impinges on the end face 1a of the semiconductor laser chip 1 from the side opposite to the condenser lens 3. The receiving signal light incident on the end face 1a is reflected in accordance with the law of reflection and is reflected at an angle of $\theta_1$ to the side opposite to the incident light to the normal A of the end face 1a, and advances as reflected light Q. If this $\theta_1$ (that is, $n \cdot \phi$) is greater than $\sin^{-1}$ (NA), the reflected light Q does not enter the entrance pupil of the condenser lens 3. FIG. 2 is the other embodiment of the optical communication unit according to this invention, in which a light reflecting section 5 is arranged between the semiconductor laser chip 1 and the condenser lens 3, and the semiconductor laser chip 1, the condenser lens 3, and the light reflecting section 5 are arranged in such a manner that a plane parallel to the substrate surface 1b of the semiconductor laser chip 1 and the optical axis of the condenser lens 3 cross at right angles.

Because the end face 1a which is a light emitting plane of the semiconductor laser chip 1 is tilted by angle $\phi$ to the perpendicular plane as shown in FIG. 2, the beam of the transmitting signal light emitted from the semiconductor laser chip 1 is emitted deviated by $(n-1) \cdot \phi$ with respect to the horizontal direction parallel to the chip substrate surface 1b. Consequently, in order to completely couple with the condenser lens 3 mounted in such a manner that the optical axis is located in the vertical direction, the angle of the reflected plane 5a of the light reflected section 5 is reduced by $\delta = (n-1) \cdot \phi / 2$ from 45°, thereby enabling the transmitting signal light from the semiconductor laser chip 1 to be carried over to the condenser lens 3 to the maximum.

On the other hand, the receiving signal light from the optical transmission path is reflected on the reflected surface 5a of the light reflected section 5 and advances to the light emitting element 1 side, and further it is reflected at the light emitting element 1 and moves $\theta_1 + \phi = (n+1) \cdot \phi$ upwards from the horizontal surface as the reflected light Q, and it does not return to the reflected plane 5a, and even if it returns to the reflected plane 5a, the reflecting direction is further deviated and the light does not couple with the condenser lens 3.

In FIG. 2 there is shown an inclination of the end face 1a of the semiconductor chip 1, that is, on the rear side of the chip substrate there is provided a light reflecting section 5, and there is shown the tilting direction in which the edge on the rear side approaches the side of the light reflecting section 5 designated to be positive.

Figure 3A:
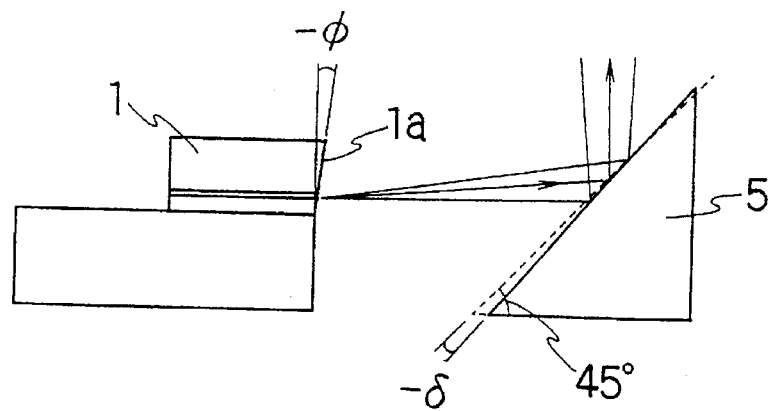
FIGS. 3(a) to 3(c) illustrate positional relation based on either of positive and negative of an inclination of an end of face of a light emitting element.
Figure 3B:
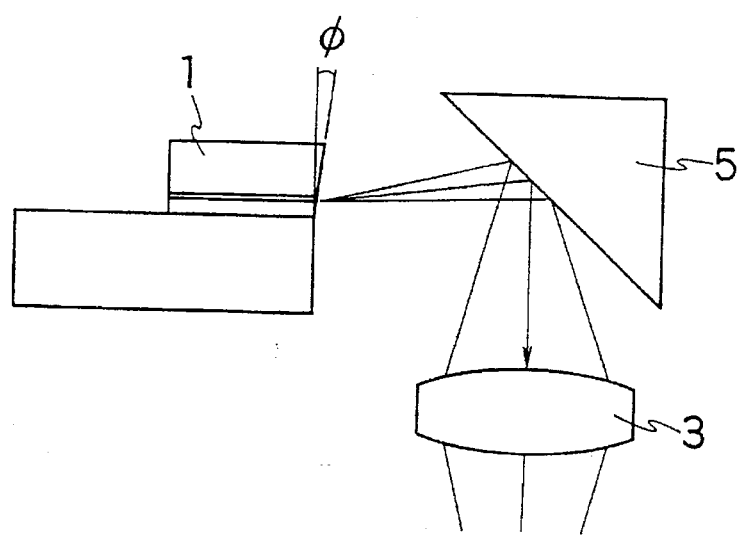
Figure 3C:
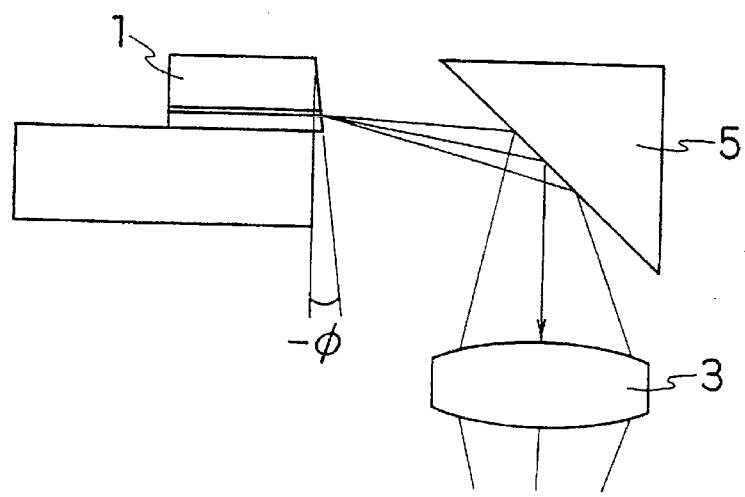
Figure 4:
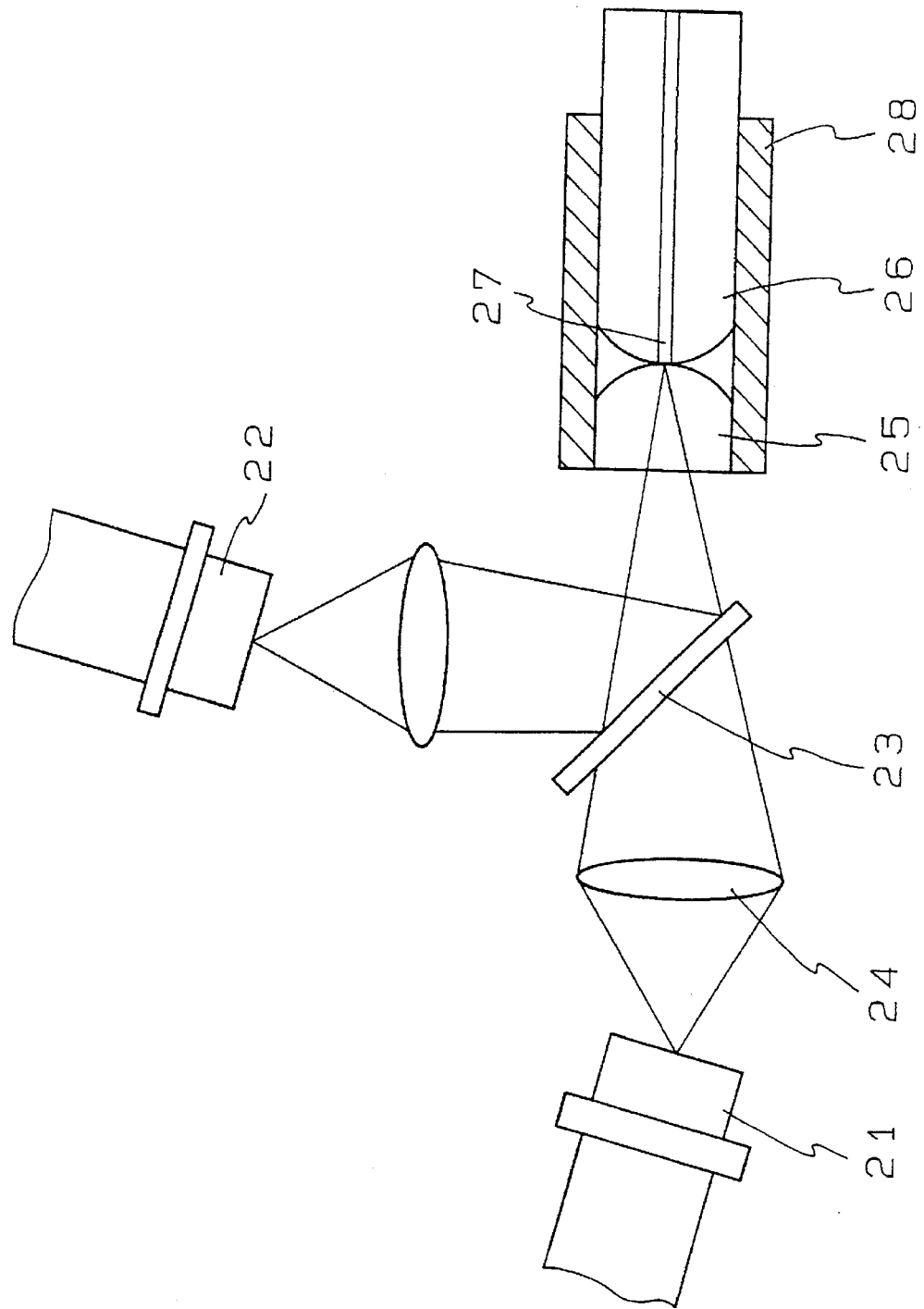
FIG. 4 is a schematic illustration showing a part of an example of a conventional optical communication unit.
Figure 5:
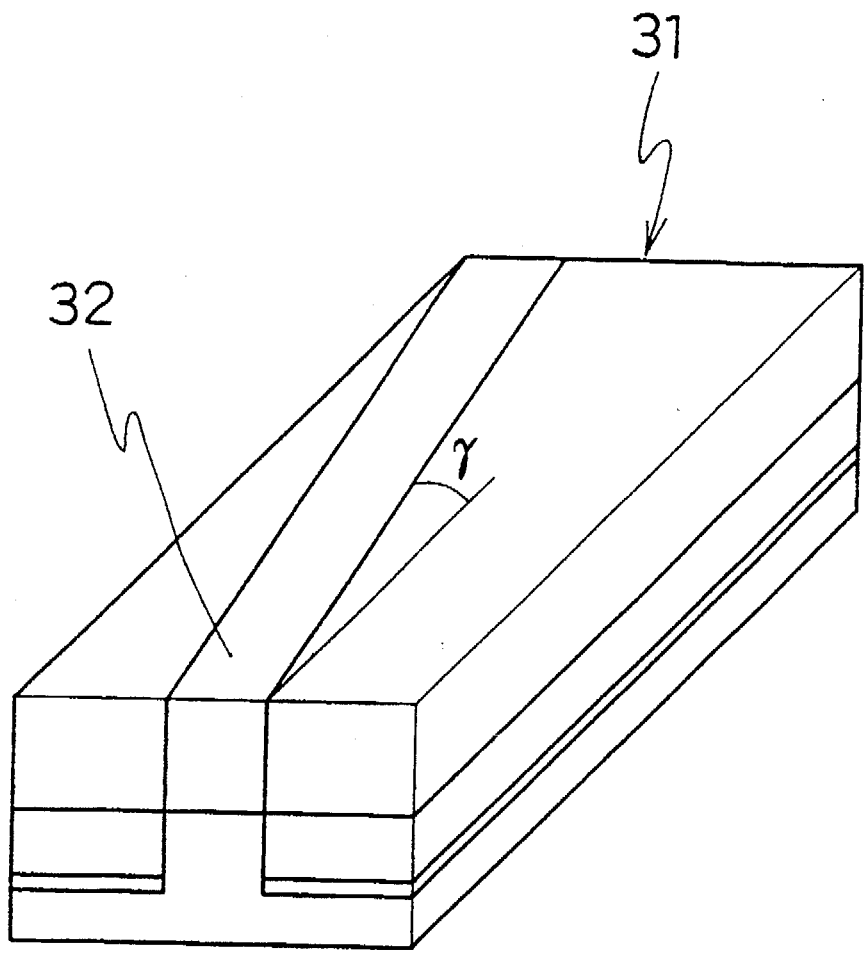
FIG. 5 is a perspective view of a conventional semiconductor laser in which stripe groove is inclined.

Consequently, in case of going away from the light reflecting section 5 on the substrate rear side as shown in FIG. 3(a), the inclination of the end face 1a is designated to be negative and is treated as $(-\phi)$ when in the substrate surface side there exists the light reflecting section 5, that is, When the condenser lens 3 replaces with the light reflecting section 5 as shown in FIGS. 3(b) and 3(c), the inclination angle $\phi$ in case that the surface side of the chip substrate approaches the light reflecting section 5 side (see FIG. 3(b)) is positive, and in the case of the inclination angle shown in FIG. 3(c), the inclination angle is negative. In other words, the angle is positive when said light emitting surface and said reflecting surface are inclined in a different direction with respect to said perpendicular surface, and said angle is negative when said light emitting surface and said reflecting surface are inclined in the same direction with respect to said perpendicular surface.

As described above, because according to this invention, the outgoing beam of the semiconductor laser which is the light emitting element can be nearly completely coupled to the condenser lens to be coupled to the optical transmission path such as optical fibers, and the receiving signal light from the optical transmission path is reflected in the direction not affecting the optical transmission path, the light of the light emitting element can be efficiently utilized and the receiving signal light is not returned to the optical transmission path again. As a result, even a light emitting element with small output can be sufficiently used as the transmitting signal light, improving the I-L characteristics, which is a relationship between the current and the optical output as well as preventing detrimental effects on other optical communication units.

In addition, in the semiconductor laser with a stripe groove formed obliquely, centering is extremely difficult in assembling the light emitting element, condenser lens, and the like, but according to this invention, only disposing the substrate surface of the semiconductor laser chip on a level chip mount and the like can align the light emitting element to the optical axis direction, enabling extremely easy assembly. In addition, because the off-angle substrate can be continuously fabricated by cutting from ingot, semiconductor laser chips with a constant inclination angle and stable quality can be obtained. As a result, the quality of the optical communication unit using this semiconductor laser is stabilized and the reliability is improved.

Though several embodiments of the present invention are described above, it is to be understood that the present invention is not limited only to the above-mentioned, various changes and modifications may be made in the invention without departing from the spirit and scope thereof.

What is claimed is:

1. An optical communication unit comprising:
   light emitting element for emitting a transmission signal light;
   a condenser lens for coupling said transmission signal light from said light emitting element to an optical transmission path; and
   a light receiving element for receiving a receiving signal light from said optical transmission path;
   wherein a light emitting surface in said light emitting element is formed by a plane which is tilted from a plane which is perpendicular to a substrate surface of a chip in said light emitting element, wherein an absolute value of an angle between said light emitting surface and said perpendicular plane is at least $1/n \cdot \sin^{-1}(NA)$, wherein n is an index of refraction of a light emitting layer, and NA is a numerical aperture of said condenser lens.

2. The optical communication unit of claim 1, wherein said light emitting surface is a cleavage plane.

3. The optical communication unit of claim 2, wherein a light emitting layer in a semiconductor laser is formed on a plane parallel to said substrate surface.

4. The optical communication unit of claim 1, wherein a light emitting layer in a semiconductor laser is formed on a plane parallel to said substrate surface.

5. An optical communication unit comprising:

light emitting element for emitting a transmission signal light;

condenser lens for coupling said transmission signal light from said light emitting element to an optical transmission path; and a light receiving element for receiving a receiving signal light from said optical transmission path;

wherein a light emitting surface in said light emitting element is formed by a plane which is tilted from a plane which is perpendicular to a substrate surface of a chip in said light emitting element, wherein said light emitting element and said condenser lens are arranged in such a manner that said substrate surface of said chip and an optical axis of said condenser lens cross at right angles, and a light reflecting section is arranged between said light emitting element and said condenser lens, such that a light from said light emitting element is reflected to advance in a side of said condenser lens.

6. The optical communication unit of claim 5, wherein said light reflecting section is common to said light receiving element.

7. The optical communication unit of claim 6, wherein an angle of a reflecting surface of said light reflecting section with respect to said substrate surface is $45°-(n-1)/2 \cdot \phi$, where n is an index of refraction of a light emitting layer, and $\phi$ is a tilted angle of said light emitting surface to said perpendicular plane in said substrate surface of said chip, said angle is positive when said light emitting surface and said reflecting surface are inclined in a different direction with respect to said perpendicular surface, and said angle is negative when said light emitting surface and said reflecting surface are inclined in the same direction with respect to said perpendicular surface.

8. The optical communication unit of claim 5, wherein an angle of a reflecting surface of said light reflecting section with respect to said substrate surface is $45°-(n-1)/2 \cdot \phi$, where n is an index of refraction of a light emitting layer, and $\phi$ is a tilted angle of said light emitting surface to said perpendicular plane in said substrate surface of said chip, said angle is positive when said light emitting surface and said reflecting surface are inclined in a different direction with respect to said perpendicular surface, and said angle is negative when said light emitting surface and said reflecting surface are inclined in the same direction with respect to said perpendicular surface.

9. The optical communication unit of claim 5, wherein said light emitting surface is a cleavage plane.

10. The optical communication unit of claim 9, wherein a light emitting layer in a semiconductor laser is formed on a plane parallel to said substrate surface.

11. The optical communication unit of claim 5, wherein a light emitting layer in a semiconductor laser is formed on a plane parallel to said substrate surface.

12. The semiconductor laser comprising:

a planar semiconductor substrate; and a semiconductor layer stacked on said semiconductor substrate, said semiconductor layer including a light emitting layer;

wherein an end face of said semiconductor layer is formed inclined to a plane which is perpendicular to a surface of said semiconductor substrate, light being irradiated from said end face, wherein said semiconductor substrate has a polished plane tilted 2° to 10° to a {100} crystal plane, said semiconductor layer being stacked on said semiconductor substrate in parallel, said end face being a cleavage plane.

* * * * *